(12) United States Patent
Jiang et al.

(10) Patent No.: US 11,477,380 B2
(45) Date of Patent: Oct. 18, 2022

(54) STABILIZATION DEGREE ADJUSTMENT METHOD AND DEVICE, AND STORAGE MEDIUM

(71) Applicant: SZ DJI TECHNOLOGY CO., LTD., Shenzhen (CN)

(72) Inventors: Yi Jiang, Shenzhen (CN); Wen Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/031,321

(22) Filed: Sep. 24, 2020

(65) Prior Publication Data

US 2021/0006716 A1 Jan. 7, 2021

Related U.S. Application Data

(63) Continuation of application No. PCT/CN2018/080717, filed on Mar. 27, 2018.

(51) Int. Cl.
*H04N 5/232* (2006.01)
*G03B 17/56* (2021.01)

(52) U.S. Cl.
CPC ....... *H04N 5/23258* (2013.01); *G03B 17/561* (2013.01)

(58) Field of Classification Search
USPC ............ 396/428, 55, 53; 348/208.99–208.16
See application file for complete search history.

(56) References Cited

U.S. PATENT DOCUMENTS

| 9,658,518 | B2 | 5/2017 | Nordhaug | |
|---|---|---|---|---|
| 2015/0078738 | A1* | 3/2015 | Brooke | G05B 15/02 396/53 |
| 2016/0198088 | A1* | 7/2016 | Wang | H04N 5/23238 348/36 |
| 2020/0124228 | A1* | 4/2020 | Guo | H04N 5/225251 |

FOREIGN PATENT DOCUMENTS

| CN | 102712359 A | 10/2012 |
|---|---|---|
| CN | 103171459 A | 6/2013 |
| CN | 104965524 A | 10/2015 |
| CN | 105416558 A | 3/2016 |
| CN | 105744162 A | 7/2016 |
| CN | 205606108 U | 9/2016 |
| CN | 107181914 A | 9/2017 |
| CN | 107278246 A | 10/2017 |
| JP | 2015218825 A | 12/2015 |
| WO | 2017206072 A1 | 12/2017 |

OTHER PUBLICATIONS

The World Intellectual Property Organization (WIPO) International Search Report for PCT/CN2018/080717 dated Dec. 29, 2018 4 Pages (including translation).

* cited by examiner

*Primary Examiner* — Xi Wang
(74) *Attorney, Agent, or Firm* — Anova Law Group, PLLC

(57) ABSTRACT

A stabilization degree adjustment method includes obtaining a stabilization degree adjustment instruction and adjusting a stabilization degree of a stabilization mechanism according to the stabilization degree adjustment instruction. The stabilization mechanism is configured to support a load.

20 Claims, 5 Drawing Sheets

STABILIZATION DEGREE ADJUSTMENT METHOD AND DEVICE, AND STORAGE MEDIUM

CROSS-REFERENCE TO RELATED APPLICATION

This application is a continuation of International Application No. PCT/CN2018/080717, filed Mar. 27, 2018, the entire content of which is incorporated herein by reference.

TECHNICAL FIELD

The present disclosure relates to the technical field of photographing, and in particular, to a method and a device for adjusting a stabilization degree, and a storage medium.

BACKGROUND

Stabilizer is a device that can provide a stable support for a load. The equipment installed with a stabilizer can be kept stable during use. For example, using stabilizer can improve the shooting effect in unstable environments and make the shot image clearer.

In practical applications, in order to get better shooting quality, it is sometimes necessary to adjust the stabilization degree of the stabilizer. Therefore, how to achieve the adjustment of the stabilization degree of the stabilizer has always been a hot spot in the industry.

SUMMARY

In accordance with the disclosure, there is provided a stabilization degree adjustment method including obtaining a stabilization degree adjustment instruction and adjusting a stabilization degree of a stabilization mechanism according to the stabilization degree adjustment instruction. The stabilization mechanism is configured to support a load.

Also in accordance with the disclosure, there is provided a stabilization mechanism configured to support a load. The stabilization mechanism includes a memory storing program codes and a processor configured to call the program codes and execute the program codes to obtain a stabilization degree adjustment instruction and adjust a stabilization degree of the stabilization mechanism according to the stabilization degree adjustment instruction.

Also in accordance with the disclosure, there is provided a gimbal device including a stabilization mechanism configured to support a load. The stabilization mechanism includes a memory storing program codes and a processor configured to call the program codes and execute the program codes to obtain a stabilization degree adjustment instruction and adjust a stabilization degree of the stabilization mechanism according to the stabilization degree adjustment instruction.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts.

DETAILED DESCRIPTION OF THE EMBODIMENTS

The technical solutions in the example embodiments of the present disclosure will be described clearly with reference to the accompanying drawings. The described embodiments are some of the embodiments of the present disclosure, rather than all the embodiments. Based on the embodiments of the present disclosure, all other embodiments obtained by a person of ordinary skill in the art without creative efforts shall fall within the scope of the present disclosure. In the case of no conflict, the following embodiments and the features in the embodiments can be combined with each other.

A stabilization degree adjustment method and device, and a storage medium are provided according to the embodiments of the disclosure. The device may include a stabilization mechanism, a gimbal device, a photographing device, and a support device. The stabilization mechanism involved in this disclosure may be a vertical stabilization mechanism, which is not limited here. In the vertical stabilization mechanism, based on a three-axis gimbal, one more degree of freedom for stabilization (in vertical or gravity direction), which is the fourth axis, is added.

In the vertical stabilization mechanism, one more degree of freedom for stabilization may be added on the basis of an axial stabilization mechanism. Besides the three-axis gimbal described above, the axial stabilization mechanism may also be a single-axis gimbal, a dual-axis gimbal or another type of gimbal.

Figure 1:
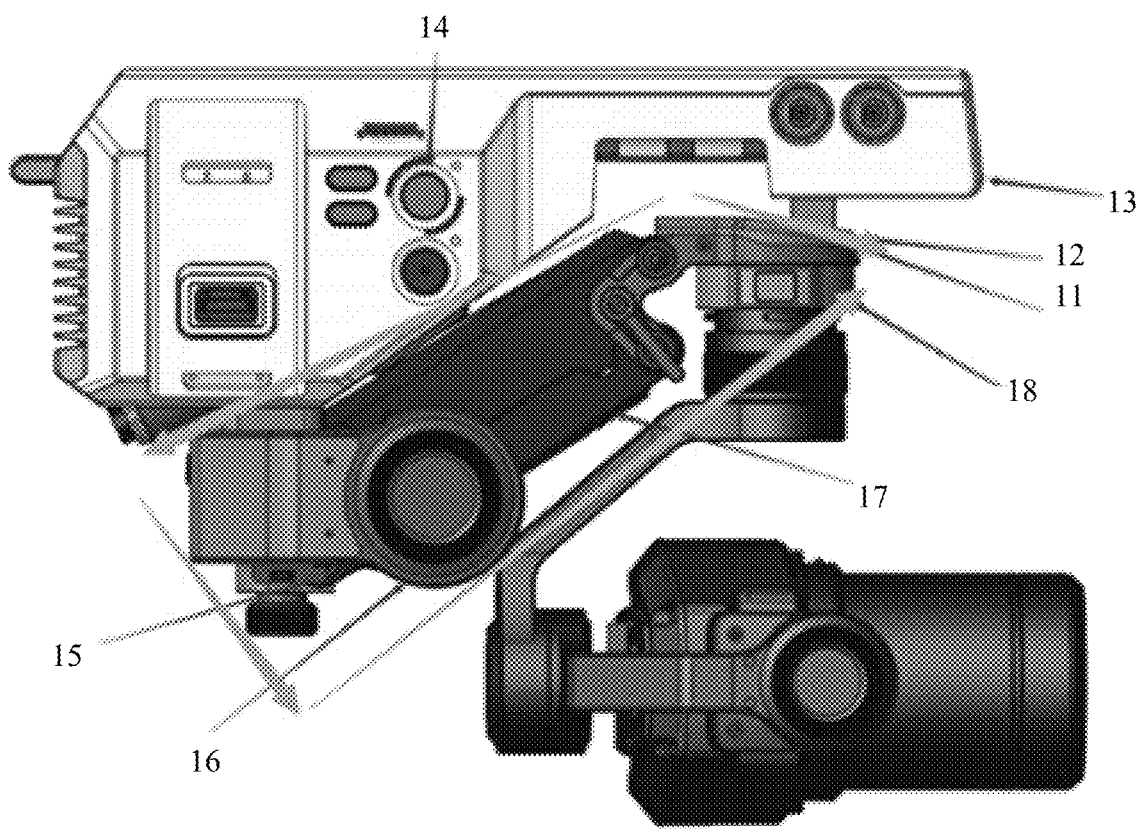
FIG. 1 is a schematic structural diagram of a stabilization mechanism according to an embodiment of the disclosure.

FIG. 1 is a schematic structural diagram of a stabilization mechanism according to an embodiment of the disclosure. Besides the vertical stabilization mechanism described above, the stabilization mechanism involved in this disclosure may also be a stabilization mechanism in another direction in practical applications. In this embodiment, the vertical stabilization mechanism is used as an example for description.

As shown in FIG. 1, one end of the vertical stabilization mechanism can be connected to a base, and the other end can be connected to an axial stabilization mechanism. The base can be used as a support for the vertical stabilization mechanism or an intermediate transition member connected to a third party, and the axial stabilization mechanism can be a three-axis gimbal, which can rotate around a first axis A1 (for example, a yaw axis), a second axis A2 (for example, a roll axis), and a third axis A3 (for example, a pitch axis). In some embodiments, an adjustment knob 14 and a visual odometry 13 are provided at the base, and the vertical stabilization mechanism includes a microcontroller 11, an inertial sensor 12, a magnetic encoder 15, a motor 16, a transmission mechanism 17, and a quick release interface 18 connecting to the axial stabilization mechanism (the axial stabilization mechanism supports a load). The microcontroller 11 can be connected to the inertial sensor 12, the visual odometry 13, the adjustment knob 14, the magnetic encoder 15, and the motor 16, and the motor 16 can be connected to the transmission mechanism 17.

The base can be used as a part of the vertical stabilization mechanism, or the base can be independent of the vertical stabilization mechanism. In addition, the position of the adjustment knob is not limited in the disclosure. Those skilled in the art can understand that the adjustment knob can be provided at the stabilization mechanism, or the adjustment knob can be provided at another component independent of the stabilization mechanism. The position of the adjustment knob on the base or on the other component is not limited in the disclosure.

The above connection includes but is not limited to an electrical connection and a communication connection. In other words, two devices connected to each other can exchange data or transmit signals. For example, the microcontroller 11 can obtain speed information of the terminal end of the vertical stabilization mechanism through the inertial sensor 12. The microcontroller 11 can obtain a current joint angle of the transmission mechanism 17 connected to the base through the magnetic encoder 15. The microcontroller 11 can obtain speed information of the base through the visual odometry 13. As another example, the microcontroller 11 outputs a drive current to drive the motor 16, so that the motor 16 generates a corresponding angular velocity, and the transmission mechanism 17 can transmit the angular velocity generated by the motor 16 to the terminal end of the vertical stabilization mechanism, that is, the installation position of the inertial sensor 12.

Further, the adjustment knob 14 is used to adjust the stabilization degree of the vertical stabilization mechanism. For example, adjusting the knob counterclockwise is in a forward direction. When the adjustment knob 14 rotates in the forward direction, the stabilization degree of the vertical stabilization mechanism is increased. When the adjustment knob 14 rotates in a reverse direction, the stabilization degree of the vertical stabilizer mechanism is decreased. In some embodiments, the adjustment knob 14 may be replaced with another physical adjustment switch, such as an adjustment slider or a physical button. In some other embodiments, the vertical stabilization mechanism may not include a physical adjustment switch.

The inertial sensor 12 is mainly used to detect and measure an acceleration, a tilt, an impact, a vibration, a rotation, and a multi-degree of freedom (DoF) motion. It is an important component to solve navigation, orientation, and motion carrier control, and can be used to obtain the speed information of the terminal end of the vertical stabilization mechanism.

The visual odometry 13 estimates a change of a position of an object with time according to the data obtained by a visual sensor, to obtain the speed information of the base. The visual sensor may be a monocular or a binocular camera.

The motor 16 is used to drive the transmission mechanism 17. The motor 16 includes a motor stator and a motor rotor. The motor stator is fixedly connected to the base, and the motor rotor is fixedly connected to the transmission mechanism 17 through a connecting rod. The speed of the motor rotor is controlled by an input signal and can react quickly.

In an automatic control system, the motor 16 is used as an actuator, which can convert a received drive current output by the microcontroller 11 into an angular displacement or an angular velocity of a motor shaft to output. The motor 16 may be a DC motor or an AC motor. In addition, the motor 16 may be a brushless motor or a brushed motor.

For example, the transmission mechanism 17 is a parallelogram transmission mechanism. A drive end of the transmission mechanism 17 is provided with the magnetic encoder 15, which is used to sense the current joint angle of the transmission mechanism 17 relative to the base, and a terminal end of the transmission mechanism 17 is equipped with the microcontroller 11, the inertial sensor 12, and the quick release interface 18 connecting to the axial stabilization mechanism (the axial stabilization mechanism supports a load). The load may be an imaging device, an audio capture device, a radio frequency (RF) sensor, a magnetic sensor, an ultrasonic sensor, etc. The imaging device may include a visual imaging device (such as an image capture device, a camera, etc.), an infrared imaging device, an ultraviolet imaging device, a thermal imaging device, etc.

The parallelogram transmission mechanism can ensure that the load (such as a camera) maintains a parallel movement relative to the base during the movement. If the base is vertical, the load will also be kept vertical during the movement. Further, the parallelogram transmission mechanism can convert an up and down arc motion of the load into a swing of a rod, which can facilitate the arrangement of the motor 16 and the installation of the inertial sensor 12.

The naming of the components of the vertical stabilization mechanism is for identification purposes only and should not be construed as limiting the embodiments of the present disclosure. The vertical stabilization mechanism may include all or some of the above components.

Figure 2:
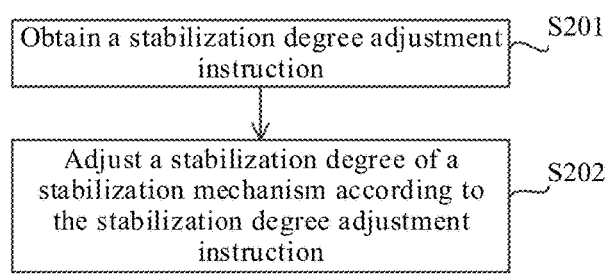
FIG. 2 is a flowchart of a stabilization degree adjustment method according to an embodiment of the disclosure.

FIG. 2 is a flowchart of a stabilization degree adjustment method according to an embodiment of the disclosure. This embodiment provides a method for adjusting the stabilization degree, which can be applied to a stabilization mechanism. The stabilization mechanism is used to support a load. The load may be different sensors described above.

As shown in FIG. 2, at S201, a stabilization degree adjustment instruction is obtained. The stabilization degree adjustment instruction is an instruction for adjusting the degree of stabilization of the stabilization mechanism.

The stabilization degree adjustment instruction may be obtained by the stabilization mechanism from another device. The other device is, for example, a communication device that performs wireless communication or wired communication with the stabilization mechanism. The stabilization degree adjustment instruction may also be generated by the stabilization mechanism according to a user input. Or, the stabilization degree adjustment instruction may also be adaptively generated by the stabilization mechanism. The method for obtaining the stabilization degree adjustment instruction may be set according to actual needs. For specific implementation, reference may be made to the example description of the subsequent embodiments, which are not limited by the embodiments of the present disclosure.

At S202, the stabilization degree of the stabilization mechanism is adjusted according to the stabilization degree adjustment instruction.

The adjustment includes strengthening, weakening, and maintaining. Through this process, the stabilization degree of the stabilization mechanism can be gradually adjusted from a complete non-stabilization state to a complete stabilization state, and the stabilization degree of the stabilization mechanism can be gradually adjusted from the complete stabilization state to the complete non-stabilization state. That is, in addition to the complete stabilization state and the complete non-stabilization state, the stabilization degree of the stabilization mechanism has an intermediate state between the complete stabilization state and the complete non-stabilization state.

When the stabilization degree is the complete non-stabilization state, the terminal end of the stabilization mechanism (that is, the end of the stabilization mechanism not connected to the base) can follow the movement of the base in a faster way, that is, the stabilization mechanism can isolate the disturbance of the base to varying degrees, but is still disturbed by the base. When the stabilization degree is the complete stabilization state, the terminal end of the stabilization mechanism can well isolate the movement of the base, that is, the stabilization mechanism can be much less disturbed by the base.

For example, if the stabilization degree adjustment instruction is an instruction to increase the stabilization degree of the stabilization mechanism, the stabilization degree of the stabilization mechanism is increased, or, if the stabilization degree adjustment instruction is an instruction to decrease the stabilization degree of the stabilization mechanism, the stabilization degree of the stabilization mechanism is decreased.

In some embodiments, with the stabilization degree adjustment instruction, the stabilization degree of the stabilization mechanism can be adjusted according to the stabilization degree adjustment instruction, so as to realize the adjustment of the stabilization degree of the stabilization mechanism. In this way, in the application of the stabilization mechanism, users can adjust the stabilization degree of the stabilization mechanism according to their own needs, or the stabilization mechanism can adaptively adjust the stabilization degree, so that the stabilization of the load supported by the stabilization mechanism also changes accordingly, which can meet different needs and improve the user experience.

In some embodiments, adjusting the stabilization degree of the stabilization mechanism according to the stabilization degree adjustment instruction (S202) may include determining a stabilization coefficient according to the stabilization degree adjustment instruction, which is used to characterize the stabilization degree of the stabilization mechanism, and adjusting the stabilization degree of the stabilization mechanism according to the stabilization coefficient. In some embodiments, adjusting stabilization degree of the stabilization mechanism according to the stabilization coefficient may include increasing or decreasing the stabilization degree of the stabilization mechanism according to the stabilization coefficient.

The value range of the stabilization coefficient may be a preset value interval, and the stabilization coefficient may be positively correlated with the stabilization degree within the preset value interval. For example, if the preset value interval is [0,1], the stabilization coefficient is positively correlated with the stabilization degree within [0,1], that is, the greater the value corresponding to the stabilization coefficient, the better the stabilization degree. When the value of the stabilization coefficient is 0, the stabilization degree of the stabilization mechanism is the worst, which is the complete non-stabilization state. When the value of the stabilization coefficient is 1, the stabilization degree of the stabilization mechanism is the best, which is the complete stabilization state. The preset value interval here is only for illustration and is not limited in the embodiments.

The above-described stabilization coefficient is only one of the representation means of the stabilization degree of the stabilization mechanism. In actual applications, other characteristics can also be used for corresponding representation as long as a correspondence with the stabilization degree of the stabilization mechanism can be established. Further, the stabilization coefficient may also have a negative correlation or other relationship with the stabilization degree within a preset value interval, and specific settings may be made according to actual needs, which is not limited in the embodiments of the present disclosure.

In some embodiments, after the stabilization coefficient is determined according to the stabilization degree adjustment instruction, the stabilization degree adjustment method may further include outputting the stabilization coefficient. The stabilization mechanism may output the stabilization coefficient through an audio component. The audio component is provided at the stabilization mechanism, or the audio component is provided at another device connected to the stabilization mechanism, or the audio component is an independent device connected to the stabilization mechanism. The stabilization mechanism can also output the stabilization coefficient through a display component. The display component is provided at the stabilization mechanism, or the display component is provided at another device connected to the stabilization mechanism, or the display component is an independent device connected to the stabilization mechanism. The connection here includes a communication connection or an electrical connection. For example, the audio component is a speaker, the display component is a display screen or a touch screen, and so on.

In the embodiments, outputting the stabilization coefficient allows the user to know the current stabilization coefficient of the stabilization mechanism, and then, according to the stabilization coefficient, the user can determine the subsequent processing, such as whether to continue the adjustment of the stabilization degree, etc., which is convenient for the user operation and further improves the user experience.

In some embodiments, the stabilization degree adjustment method may further include locking the stabilization mechanism when the stabilization mechanism is at the complete non-stabilization state. The specific implementation of locking the stabilization mechanism includes at least the following manners.

In some embodiments, locking the stabilization mechanism includes locking the stabilization mechanism at a first angle. The first angle is a preset joint angle of the transmission mechanism in the stabilization mechanism connected to the base.

In some other embodiments, locking the stabilization mechanism includes locking the stabilization mechanism at a second angle. The second angle is a joint angle of the transmission mechanism in the stabilization mechanism connected to the base when the stabilization degree adjustment instruction is obtained.

In some other embodiments, locking the stabilization mechanism includes detecting a difference between the first angle and the second angle. The first angle is the preset joint angle of the transmission mechanism in the stabilization mechanism connected to the base, and the second angle is a current joint angle of the transmission mechanism in the stabilization mechanism connected to the base acquisition when the stabilization degree adjustment instruction is obtained (the stabilization degree adjustment instruction indicates that the stabilization mechanism needs to be adjusted to the complete non-stabilization state) is obtained. If the difference meets a preset condition, the stabilization mechanism is locked at the first angle, and if the difference does not meet the preset condition, the stabilization mechanism is locked at the second angle. For example, the preset condition may be that the absolute value of the difference between the first angle and the second angle is less than or equal to a preset value, where the preset value is, for example, 5 degrees.

In some embodiments, the first angle may be 0 degrees. Based on the connection manner between the stabilization mechanism and the base, when the first angle is 0 degrees, the stabilization mechanism may be parallel to the horizontal direction, which is not limited in the embodiments of the present disclosure.

In practical applications, the stabilization mechanism may have the function of locking the stabilization mechanism through any one or more of the above-described implementation methods. For example, the stabilization mechanism has the function of locking itself through the first and second implementation methods, but the specific implementation method can be selected by the user or determined by other methods, such as according to the use frequency of implementation method or the implementation method used last time.

In the above-described embodiments, a relative stability of the stabilization mechanism relative to the base is achieved by locking the stabilization mechanism in the complete non-stabilization state.

In some embodiments, adjusting the stabilization degree of the stabilization mechanism according to the stabilization degree adjustment instruction may include adjusting a change range of a terminal end of the stabilization mechanism according to the stabilization degree adjustment instruction, so that the stabilization degree of the stabilization mechanism is adjusted. The change range of the terminal end of the stabilization mechanism is a change range of the terminal end of the stabilization mechanism relative to the ground.

In some embodiments, when the stabilization degree adjustment instruction indicates a stabilization coefficient, adjusting the change range of the terminal end of the stabilization mechanism according to the stabilization degree adjustment instruction may include determining a current end-to-ground speed of the stabilization mechanism, and according to the stabilization coefficient and a desired end-to-ground speed, adjusting the current end-to-ground speed so that the change range of the terminal end of the stabilization mechanism is adjusted. The "end-to-ground speed" of the stabilization mechanism refers to the speed of the terminal end of the stabilization mechanism relative to the ground.

The stabilization mechanism itself has a current end-to-ground speed, and the stabilization mechanism can adjust the current end-to-ground speed according to the stabilization coefficient and the desired end-to-ground speed to achieve the purpose of adjusting the change range of the terminal end of the stabilization mechanism. For example, the desired end-to-ground speed may be 0, which is not limited in the embodiments of the present disclosure. The user may set the desired end-to-ground speed according to actual needs or empirical values.

Further, determining the current end-to-ground speed of the stabilization mechanism may include obtaining the current joint angle of the transmission mechanism in the stabilization mechanism connected to the base, obtaining the speed information of the base, obtaining the speed information of the terminal end of the stabilization mechanism, and determining the current end-to-ground speed of the stabilization mechanism based on the current joint angle, speed information, and speed information of the terminal end.

Referring again to FIG. 1, the vertical stabilization mechanism can obtain the current joint angle of the transmission mechanism 17 connected to the base through the magnetic encoder 15. The vertical stabilization mechanism can obtain the speed information of the base through the visual odometry 13, and the speed information is, for example, the speed of movement. The vertical stabilization mechanism can obtain the speed information of the terminal end of the vertical stabilization mechanism through the inertial sensor 12. The speed information of the terminal end is, for example, the angular velocity and acceleration corresponding to the terminal end of the vertical stabilization mechanism. The terminal end of the vertical stabilization mechanism is the installation position of the inertial sensor 12.

For determining the current end-to-ground speed of the stabilization mechanism based on the current joint angle, speed information, and speed information of the terminal end, it can be understood that the current joint angle, speed information, and speed information of the terminal end can be substituted into a preset data fusion algorithm to obtain the current end-to-ground speed of the stabilization mechanism.

Figure 3:
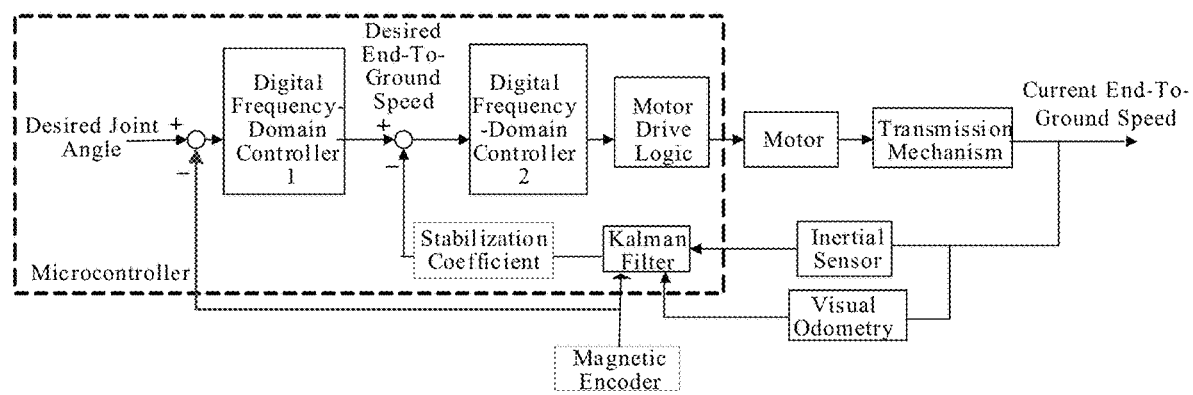
FIG. 3 is a control block diagram of the stabilization mechanism shown in FIG. 1.

Referring to a control block diagram shown in FIG. 3, a digital frequency-domain controller 1, a digital frequency-domain controller 2, a Kalman filter, and a motor drive logic include preset algorithms. The digital frequency-domain controller 1 (corresponding to a speed feedback loop control) and the digital frequency-domain controller 2 (corresponding to a position feedback loop control) include a controller algorithm, receive an input signal in a control loop, then calculate a control instruction and pass it to a next process. Kalman filter includes a preset data fusion algorithm, fuses the current joint angle, speed information, and speed information of the terminal end, and outputs the current end-to-ground speed with high precision. The motor drive logic includes an electronic speed control (ESC) control algorithm and a motor drive circuit, is configured to convert the control instruction of the digital frequency-domain controller 2 into a drive current to drive the motor 16, so that the motor 16 can generate a corresponding angular velocity according to the instruction and transmit it to the terminal end of the vertical stabilization mechanism through the transmission mechanism 17. The stabilization coefficient is reflected in the rotation of the adjustment knob.

As shown in FIG. 3, in combination with the structure shown in FIG. 1, the counterclockwise direction of the adjustment knob 14 is a forward direction. When the adjustment knob 14 is rotated in the forward direction, the gain coefficient on the speed feedback loop increases linearly. In this scenario, the Kalman filter in the microcontroller 11 receives a three-axis angular velocity and a three-axis acceleration from the inertial sensor 12 to obtain the speed information of the terminal end of the stabilization mechanism. The Kalman filter receives a joint angle from the magnetic encoder 15 to obtain a current joint angle of the transmission mechanism 17 in the stabilization mechanism connected to the base. The Kalman filter receives a three-axis speed signal from the visual odometry 13 to obtain the speed information of the base, and output a current end-to-ground speed of the stabilization mechanism after performing a fusion on the above obtained information. Further, the joint angle signal of the magnetic encoder can also be fed back to the digital frequency-domain controller 1 to obtain a desired end-to-ground speed of the stabilization mechanism in combination with a desired joint angle. If the gain coefficient increases linearly, the gain of the speed feedback loop control corresponding to the digital frequency-domain controller 2 is enhanced, and the gain of the position feedback loop control corresponding to the digital frequency-domain controller 1 is reduced. That is, as the end-to-ground speed of the stabilization mechanism is adjusted by controlling the current of the motor 16 according to the desired speed relative to the ground, the current end-to-ground speed, and the stabilization coefficient, the stabilization degree of the vertical stabilization mechanism increases accordingly and the effect of the stabilization mechanism following the base decreases.

Similar to the above, when the adjustment knob 14 rotates in a reverse direction, the gain coefficient on the speed feedback loop decreases linearly, which has the effect of weakening the gain of the speed feedback loop control and enhancing the gain of the position feedback loop control. the stabilization degree of the vertical stabilization mechanism decreases accordingly and the effect of the stabilization mechanism following the base increases.

The above embodiments provide a specific implementation method for adjusting the change range of the terminal end of the stabilization mechanism according to the stabilization degree adjustment instruction, so that the stabilization degree of the stabilization mechanism is adjusted. With the change range of the terminal end of the stabilization mechanism visually embodied, it can be visually compared with the movement of the base simply, so that the stabilization degree of the stabilization mechanism can be determined visually.

In addition to adjusting the change range of the terminal end of the stabilization mechanism to adjust the stabilization degree of the stabilization mechanism, other methods, such as using a response speed of the terminal end of the stabilization mechanism, may also be employed, which are not limited in the embodiments of the present disclosure.

On the basis of the above-described embodiments, how to obtain a stabilization degree adjustment instruction is explained in the following embodiments.

In some embodiments, the stabilization mechanism obtains the stabilization degree adjustment instruction through a physical adjustment switch. The physical adjustment switch may be provided at the stabilization mechanism, or, as shown in FIG. 1, the physical adjustment switch is electrically or communicatively connected to the stabilization mechanism.

In these embodiments, obtaining the stabilization degree adjustment instruction (S201) may include receiving a first operation of a user on the physical adjustment switch and generating the stabilization degree adjustment instruction according to the first operation.

For example, the physical adjustment switch is an adjustment knob. In some embodiments, receiving the user's first operation on the physical adjustment switch includes receiving a rotation direction input by the user on the adjustment knob. Generating the stabilization degree adjustment instruction according to the first operation includes generating the stabilization degree adjustment instruction according to the rotation direction.

As mentioned above, the adjustment knob can have two rotation directions: a forward direction and a reverse direction. In practical applications, for example, the forward rotation can be set to enhance the stabilization degree, and the reverse rotation can be set to reduce the stabilization degree, or, the reverse rotation is set to increase the stabilization degree, and the forward rotation is set to reduce the stabilization degree.

The user rotates the adjustment knob in a forward or reverse direction. Correspondingly, the stabilization mechanism receives the rotation direction input by the user for the adjustment knob and generates a stabilization degree adjustment instruction according to the rotation direction.

As another example, the physical adjustment switch is an adjustment slider. In some embodiments, receiving the first operation of the user on the physical adjustment switch includes receiving a sliding direction input by the user for the adjustment slider. Generating the stabilization degree adjustment instruction according to the first operation includes generating the stabilization degree adjustment instruction according to the sliding direction.

In some embodiments, the adjustment slider is set to slide up and down, or the adjustment slider is set to slide left and right, which includes sliding from the middle to both sides. For example, the adjustment slider includes two sliding slots, one of which is used to enhance the stabilization degree, and the other sliding slot is used to reduce the stabilization degree, or, the adjustment slider includes one sliding slot set up and down. Sliding upward indicates that the stabilization degree is increased and sliding downward indicates that the stabilization degree is reduced. The adjustment slider may include one sliding slot set from left to right. Sliding to the right indicates that the stabilization degree is increased and sliding to the left indicates that the stabilization degree is reduced. There are many other manners, which are not described in detail here.

The user slides the adjustment slider. Correspondingly, the stabilization mechanism receives the sliding direction input by the user for the adjustment slider and generates a stabilization adjustment instruction according to the sliding direction.

As another example, the physical adjustment switch is a physical button. In some embodiments, receiving the first operation of the user on the physical adjustment switch includes receiving a button amount input by the user for the physical button. Generating the stabilization degree adjustment instruction according to the first operation includes generating the stabilization degree adjustment instruction according to the button amount.

In some embodiments, the physical button includes two buttons. One of the buttons is used to enhance the stabilization degree, and the other button is used to decrease the stabilization degree. In some other embodiments, the physical button includes one button. The right side or the upper side of the button indicates that the stabilization degree is enhanced, and the left side or the lower side of the button indicates that the stabilization degree is weakened. There are many other button settings, which are not described in detail here.

The user can press the physical button one or more times. Pressing the button once can correspond to a button amount of one, or pressing the button once can correspond to a button amount of N. The specific value of N can be set according to a length of time when the button is pressed. For example, the longer the button is pressed, the greater the value of N is, or the time being pressed in a certain interval corresponds to a value of N, etc. Correspondingly, the stabilization mechanism receives the button amount input by the user for the physical button and generates a stabilization degree adjustment instruction according to the button amount.

In this implementation manner, including but not limited to the above examples, generating the stabilization degree adjustment instruction according to the first operation may include determining a change of the physical adjustment switch according to the first operation, and according to the change of the physical adjustment switch and a corresponding relationship between the physical adjustment switch and a voltage, generating the stabilization degree adjustment instruction. Taking the adjustment knob in the above example as an example, the specific explanation is as follows.

Figure 4:
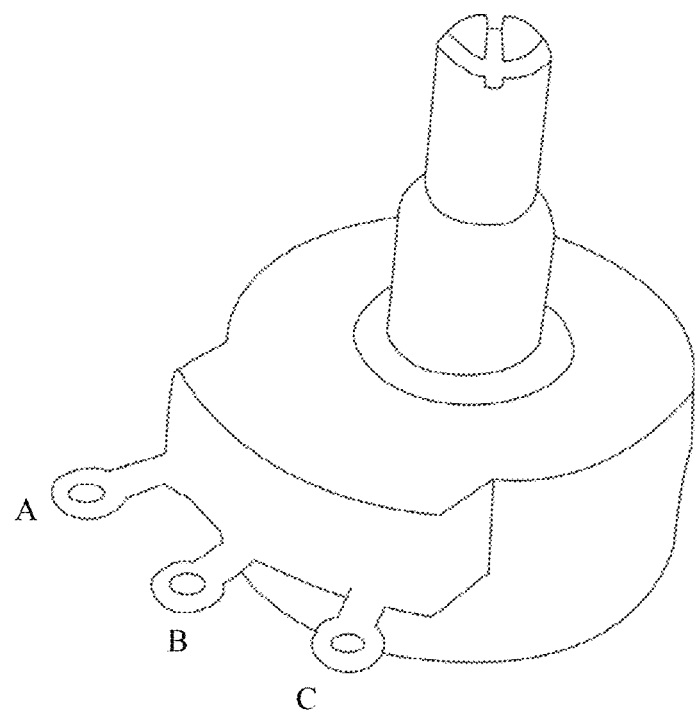
FIG. 4 is a schematic diagram of a structure of a potentiometer.
Figure 5:
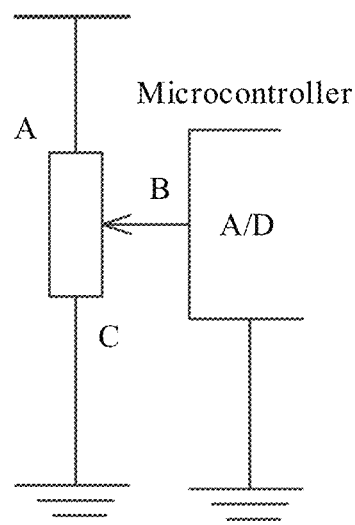
FIG. 5 is a working principle diagram of an adjustment knob according to an embodiment of the disclosure.

As shown in FIG. 4, a potentiometer is fixed inside the adjustment knob, and the resistance of terminal B of the potentiometer relative to terminal C can be changed by rotating the adjustment knob. An equivalent circuit diagram of the working principle of the adjustment knob and the potentiometer is shown in FIG. 5. Terminal A of the potentiometer is connected to a power supply (such as a 3.3V power supply), terminal C of the potentiometer is grounded, and terminal B of the potentiometer is connected to an A/D circuit interface of the microcontroller of the stabilization mechanism, so that the microcontroller can get a current voltage value of terminal B of the potentiometer. When the adjustment knob is rotated, the resistance of terminal B of the potentiometer relative to terminal C of the potentiometer changes, and then the voltage at terminal B of the potentiometer changes accordingly. According to the current voltage at terminal B of the potentiometer, the stabilization degree adjustment instruction is generated.

Figure 6:
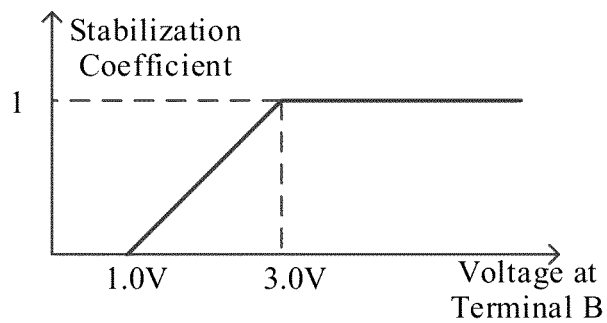
FIG. 6 is an exemplary diagram of a correspondence relationship according to an embodiment of the disclosure.

In some embodiments, when the stabilization degree adjustment instruction indicates a stabilization coefficient, the stabilization degree adjustment method further includes setting a corresponding relationship between the voltage and the stabilization coefficient. The stabilization coefficient is used to represent the stabilization degree of the stabilization mechanism. Taking the potentiometer fixedly connected to the adjustment knob as an example, the corresponding relationship between the voltage at terminal B of the potentiometer and the stabilization coefficient is shown in FIG. 6. When the voltage at terminal B is between 1.0V and 3.0V, the stabilization coefficient is in direct proportion to the voltage.

FIG. 6 is only one example of the corresponding relationship in the embodiments of the disclosure. The corresponding relationship may include the stabilization coefficient changing linearly with voltage or the stabilization coefficient changing nonlinearly with voltage. The linear change includes a linear increase and/or a linear decrease, and the nonlinear change includes one or more of the stabilization coefficient keeping constant, increasing stepwise, and decreasing stepwise, as the voltage changes. The corresponding relationship can be decided depending on how to use the stabilization coefficient to represent the stabilization degree of the stabilization mechanism.

For example, when the adjustment knob rotates counterclockwise, the voltage at terminal B increases, and the stabilization coefficient increases accordingly. When the adjustment knob rotates clockwise, the voltage at terminal B decreases, and the stabilization coefficient decreases accordingly. When the value of the stabilization coefficient is 1, the stabilization mechanism is in a complete stabilization state. At this time, the stabilization mechanism can isolate the disturbance of the base, so that the speed of the terminal end of the stabilization mechanism relative to the ground is 0. When the value of the stabilization coefficient is 0, the stabilization mechanism is in a complete non-stabilization state, and the stabilization mechanism does not produce stabilization effects. At this time, the terminal end of the stabilization mechanism and the drive end of the stabilization mechanism (e.g., the end of the stabilization mechanism connected to the base) remain relatively still with respect to each other, and the joint angle closed loop makes the transmission mechanism always locked at a certain fixed angle. The foregoing embodiments can be referred to for detailed description, which is not repeated here. When the stabilization coefficient is closer to 1, the stabilization degree of the stabilization mechanism is better, and when the stabilization coefficient is closer to 0, the stabilization degree of the stabilization mechanism is worse.

In some embodiments, the stabilization mechanism obtains the stabilization degree adjustment instruction through a touch device. The touch device may be provided at the stabilization mechanism, for example, the touch device is specifically a touch screen provided at the stabilization mechanism, etc., or the touch device is electrically or communicatively connected with the stabilization mechanism, for example, the touch device is a handheld device or a wearable device that communicates with the stabilization mechanism. The handheld device is a smart phone or a smart remote control, and the wearable device is a smart bracelet, a smart necklace, a smart glove, a virtual reality (VR) device, an augmented reality (AR) device, etc.

In this implementation manner, obtaining the stabilization degree adjustment instruction (S201) may include receiving a touch operation input by a user on a touch device and generating the stabilization degree adjustment instruction according to the touch operation.

The above-described touch operation may be an operation of directly inputting the stabilization coefficient. In specific implementations, the touch operation may be an operation on a virtual button or a gesture or a sliding operation.

For example, there are two virtual buttons on the touch device. One of the virtual buttons is used to enhance the stabilization degree, and the other virtual button is used to decrease the stabilization degree. In some other embodiments, the virtual button includes one button. The right side or the upper side of the button indicates that the stabilization degree is enhanced, and the left side or the lower side of the button indicates that the stabilization degree is weakened, and so on, which is similar to the scenarios of the above two physical buttons.

The user can press the virtual button one or more times. Pressing the virtual button once can correspond to a button amount of one, or pressing the virtual button once can correspond to a button amount of M. The specific value of M can be set according to a length of time when the virtual button is pressed. For example, the longer the virtual button is pressed, the greater the value of M is, or the time being pressed in a certain interval corresponds to a value of M, etc. Correspondingly, the stabilization mechanism receives the touch operation input by the user on the touch device and generating the stabilization degree adjustment instruction according to the touch operation.

Other implementation manners are similar to the manner of the physical adjustment switch in the example embodiments, which are not repeated here.

In some embodiments, the stabilization mechanism obtains the stabilization degree adjustment instruction through a communication device. The stabilization mechanism is electrically or communicatively connected with the communication device.

In this implementation manner, obtaining the stabilization degree adjustment instruction (S201) may include receiving the stabilization degree adjustment instruction sent by a communication device of the stabilization mechanism.

Since the stabilization mechanism is connected to the communication device, the stabilization mechanism can receive the stabilization degree adjustment instruction sent from the communication device. For example, a near field communication (NFC) circuit is provided at the stabilization mechanism, and the stabilization mechanism performs near field communication with the communication device through the near field communication circuit and receives the stabilization degree adjustment instruction. The near field communication includes but is not limited to a wireless fidelity (Wi-Fi) communication, a Bluetooth (BT) communication, an ultra-wideband (UWB) communication, etc. The communication device in the embodiments of the present disclosure is not limited to the near field communication device.

The stabilization degree adjustment instruction may include a stabilization coefficient.

In some embodiments, the stabilization mechanism adaptively obtains the stabilization degree adjustment instructions.

In this implementation manner, obtaining the stabilization degree adjustment instruction (S201) may include determining a current application scenario of the stabilization mechanism and obtaining the stabilization degree adjustment instruction corresponding to the current application scenario according to a correspondence between the application scenario and a preset stabilization degree adjustment instruction.

In some embodiments, the user or manufacturer can pre-set some mapping relationships between some application scenarios and the stabilization degree adjustment instructions, that is, the corresponding relationship between the application scenarios and the preset stabilization degree adjustment instructions. The application scenarios may be application scenarios commonly used by the stabilization mechanism and the corresponding common stabilization degree adjustment instructions in these common application scenarios. In some other embodiments, the stabilization mechanism adaptively sets the corresponding relationship between the application scenario and the preset stabilization degree adjustment instruction, that is, the stabilization mechanism adaptively sets the above-described corresponding relationship based on historical experience, such as habits of previous users, and so on. During use, the corresponding relationship is updated adaptively, such as deleting, adding, or changing.

For example, according to some typical shooting scenes, some typical stabilization coefficients can be configured, for example, a stabilization coefficient for a scene with strong shake, or a stabilization coefficient for a scene that is relatively stable.

Among the above-described multiple implementation methods for obtaining the stabilization degree adjustment instruction, the stabilization mechanism may implement only one of them, or may implement multiple methods at the same time, which is not limited in the embodiments and can be specifically set according to actual needs.

Figure 7:
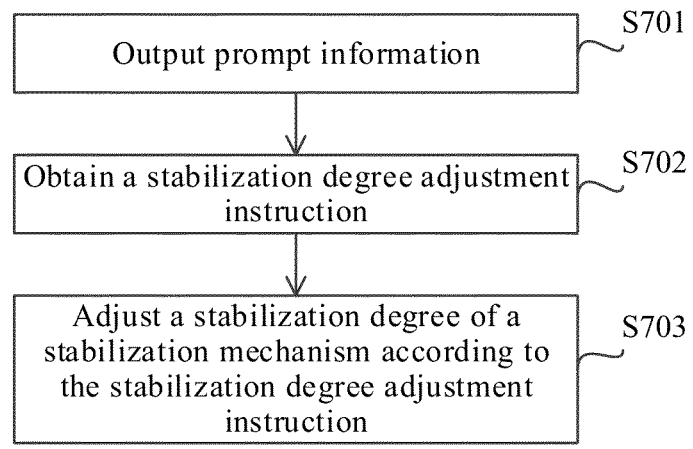
FIG. 7 is a flowchart of a stabilization degree adjustment method according to another embodiment of the disclosure.

FIG. 7 is a flowchart of a stabilization degree adjustment method according to another embodiment of the disclosure. This embodiment provides a method for adjusting the stabilization degree, which can be applied to a stabilization mechanism. The stabilization mechanism is used to support a load and the load may be different sensors described above.

As shown in FIG. 7, based on the processes shown in FIG. 2, the stabilization degree adjustment method further includes outputting prompt information (S701). The prompt information is used to prompt the user to adjust the stabilization degree of the stabilization mechanism.

In this embodiment, the output of the prompt information is similar to the output of the aforementioned stabilization coefficient. The foregoing description can be referred to for details, which is not repeated here.

At S702, a stabilization degree adjustment instruction is obtained.

This process is the same as the process of S201. The foregoing embodiment can be referred to for the description thereof, which is not repeated here.

At S703, the stabilization degree of the stabilization mechanism is adjusted according to the stabilization degree adjustment instruction.

This process is the same as the process of S202. The foregoing embodiment can be referred to for the description thereof, which is not repeated here.

In this embodiment, the user is prompted to adjust the stabilization degree of the stabilization mechanism through the output of the prompt information, therefore, the user experience is further improved.

Figure 8:
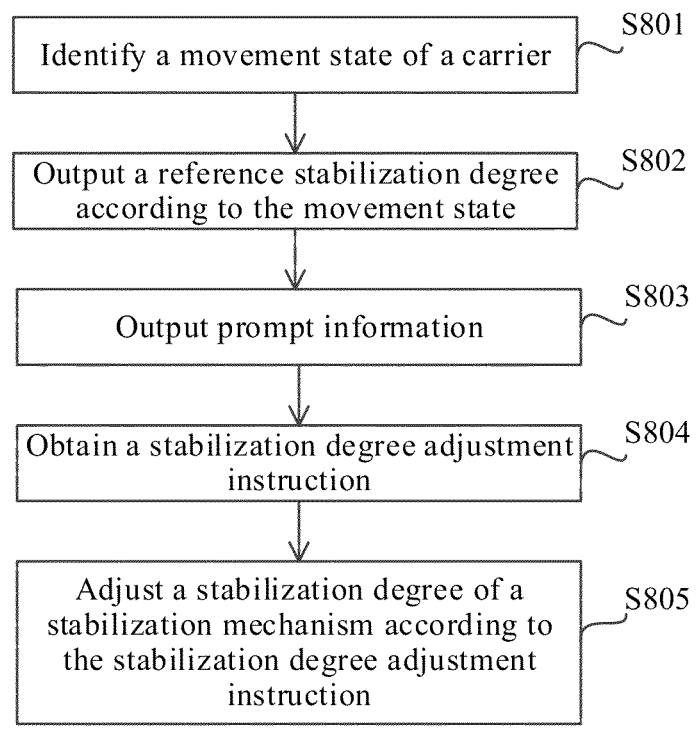
FIG. 8 is a flowchart of a stabilization degree adjustment method according to another embodiment of the disclosure.

FIG. 8 shows another example stabilization degree adjustment method consistent with the disclosure.

As shown in FIG. 8, at S801, a movement state of a carrier is identified. The carrier is used to carry the stabilization mechanism. In some embodiments, the stabilization mechanism can recognize the movement state of the carrier according to a movement speed of a base calculated according to a visual odometry.

In some embodiments, the carrier may include a support device or a creature carrying the above-described stabilization mechanism. In other words, the carrier is not limited to the user, and any movable object that can carry the stabilization mechanism can be used as the carrier.

In some embodiments, the support device may be a handheld support device, or, the support device may be a wearable support device, or, the support device may be a movable platform. In some embodiments, the movable platform may include one of an unmanned aerial vehicle (UAV), an unmanned vehicle, and an unmanned ship.

For example, when the stabilization mechanism is used for a UAV, the carrier is the UAV. In this example, identifying the movement state of the carrier includes identifying the movement state of the UAV. When the stabilization mechanism is used for a handheld camera device, the carrier is the user. In this example, identifying the movement state of the carrier includes identifying the movement state of the user.

At S802, a reference stabilization degree is output according to the movement state.

For example, the reference stabilization degree may be specifically a reference stabilization coefficient. The output here is similar to the output mentioned in the above embodiments. Details can refer to the foregoing embodiments.

The execution sequence of S801, S802, and other processes is not limited to the sequence shown in FIG. 8 in the embodiments of the present disclosure. That is, the processes of S801 and S802 are relatively independent of other processes.

At S803, prompt information is output.

This process is the same as the process of S701. The foregoing embodiment can be referred to for the description thereof, which is not repeated here.

At S804, a stabilization degree adjustment instruction is obtained.

This process is the same as the process of S201. The foregoing embodiment can be referred to for the description thereof, which is not repeated here.

At S805, the stabilization degree of the stabilization mechanism is adjusted according to the stabilization degree adjustment instruction.

This process is the same as the process of S202. The foregoing embodiment can be referred to for the description thereof, which is not repeated here.

In this embodiment, by identifying the movement state of the carrier, and outputting the reference stabilization degree according to the movement state, the stabilization mechanism can intelligently adapt to different pre-configured stabilization degrees under different movement states.

In summary, the embodiments of the present disclosure ensure that in the application process of the stabilization mechanism, the user can adjust the stabilization degree of the stabilization mechanism according to personal desires or the stabilization mechanism can adaptively adjust the stabilization degree. As a result, the stability of the load supported by the stabilization mechanism change accordingly, and the user experience is improved.

The following are device embodiments of the disclosure, which can be used to implement the method embodiments of the disclosure. For details not disclosed in the device embodiment of the disclosure, reference can be made to the method embodiments of the disclosure.

Figure 9:
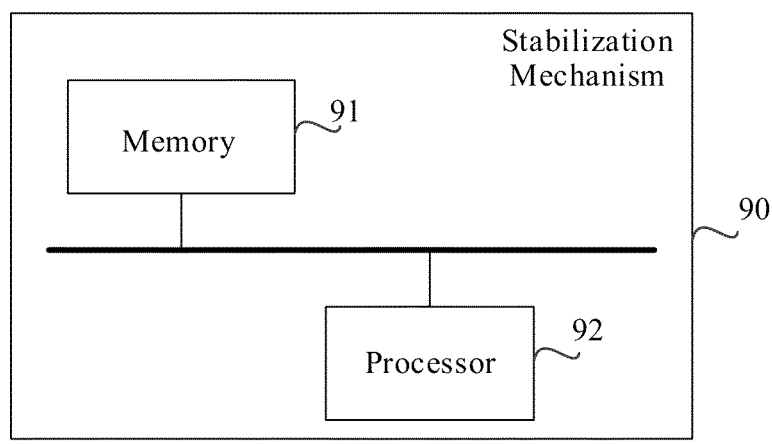
FIG. 9 is a schematic structural diagram of a stabilization mechanism according to another embodiment of the disclosure.

FIG. 9 is a schematic structural diagram of a stabilization mechanism according to an embodiment of the disclosure. The stabilization mechanism can be used to support a load. As shown in FIG. 9, the stabilization mechanism 90 includes a memory 91 and a processor 92. The memory 91 and the processor 92 are connected by a bus. In FIG. 9, a thick line is used to indicate the bus.

The memory 91 is configured to store program codes.

The processor 92 is configured to call the program code in the memory 91, and when the program code is executed, perform the following operations of obtaining a stabilization degree adjustment instruction, and adjusting a stabilization degree of the stabilization mechanism according to the stabilization degree adjustment instruction.

The stabilization mechanism can be configured to implement a technical solution consistent with the disclosure, such as the technical solution in the method embodiment shown in FIG. 2, and their implementation principles and technical effects are similar, which are not repeated here.

In some embodiments, the stabilization mechanism 90 may include a vertical stabilization mechanism.

In some embodiments, when adjusting the stabilization degree of the stabilization mechanism according to the stabilization degree adjustment instruction, the processor 92 is specifically configured to determine a stabilization coefficient according to the stabilization degree adjustment instruction, where the stabilization coefficient is used to represent the stabilization degree of stabilization mechanism 90, and adjust the stabilization degree of the stabilization mechanism 90 according to the stabilization coefficient.

In some embodiments, when adjusting the stabilization degree of the stabilization mechanism according to the stabilization degree adjustment instruction, the processor 92 is specifically configured to increase or decrease the stabilization degree of the stabilization mechanism 90 according to the stabilization coefficient.

In some embodiments, a value range of the stabilization coefficient is a preset value interval, and the stabilization coefficient is positively correlated with the stabilization degree within the preset value interval.

In some embodiments, the processor 92 is further configured to output the stabilization coefficient after determining the stabilization coefficient according to the stabilization degree adjustment instruction.

In some embodiments, the processor 92 is further configured to lock the stabilization mechanism 90 when the stabilization mechanism 90 is in a complete non-stabilization state.

In some embodiments, when locking the stabilization mechanism 90, the processor 92 is specifically configured to lock the stabilization mechanism 90 at a first angle, and the first angle is a preset joint angle of the transmission mechanism in the stabilization mechanism 90 connected to the base.

In some embodiments, when locking the stabilization mechanism 90, the processor 92 is specifically configured to lock the stabilization mechanism 90 at a second angle, and the second angle is a joint angle of the transmission mechanism in the stabilization mechanism 90 connected to the base when the stabilization degree adjustment instruction is obtained.

In some embodiments, when locking the stabilization mechanism 90, the processor 92 is specifically configured to detect a difference between the first angle and the second angle. The first angle is the preset joint angle of the transmission mechanism in the stabilization mechanism 90 connected to the base, and the second angle is a current joint angle of the transmission mechanism in the stabilization mechanism 90 connected to the base acquisition when the stabilization degree adjustment instruction is obtained. If the difference meets a preset condition, the stabilization mechanism 90 is locked at the first angle, and if the difference does not meet the preset condition, the stabilization mechanism 90 is locked at the second angle.

In some embodiments, the first angle may be 0 degrees, or the first angle may be other angles.

In some embodiments, when adjusting the stabilization degree of the stabilization mechanism 90 according to the stabilization degree adjustment instruction, the processor 92 is specifically configured to adjust a change range of the terminal end of the stabilization mechanism 90 according to the stabilization degree adjustment instruction, so that stabilization degree of the stabilization mechanism 90 is adjusted.

In some embodiments, in response to the stabilization degree adjustment instruction indicating the stabilization coefficient, when adjusting the change range of the terminal end of the stabilization mechanism 90 according to the stabilization degree adjustment instruction, the processor 92 is specifically configured to determine a current end-to-ground speed of the stabilization mechanism 90, and according to the stabilization coefficient and a desired end-to-ground speed, adjust the current end-to-ground speed so that the change range of the terminal end of the stabilization mechanism 90 is adjusted.

In some embodiments, when determining the current end-to-ground speed of the stabilization mechanism, the processor 92 is specifically configured to obtain the current joint angle of the transmission mechanism in the stabilization mechanism 90 connected to the base, obtain the speed information of the base, obtain the speed information of the terminal end of the stabilization mechanism 90, and determine the current end-to-ground speed of the stabilization mechanism 90 based on the current joint angle, speed information, and speed information of the terminal end.

In some embodiments, the desired end-to-ground speed may be 0.

In some embodiments, when obtaining the stabilization degree adjustment instruction, the processor 92 is specifically configured to receive a first operation of a user on the physical adjustment switch and generate the stabilization degree adjustment instruction according to the first operation.

In some embodiments, when receiving the first operation of the user on the physical adjustment switch, the processor 92 is specifically configured to receive a rotation direction input by the user on the adjustment knob. When generating the stabilization degree adjustment instruction according to the first operation, the processor 92 is specifically configured to generate the stabilization degree adjustment instruction according to the rotation direction.

In some embodiments, when receiving the first operation of the user on the physical adjustment switch, the processor 92 is specifically configured to receive a sliding direction input by the user for the adjustment slider. When generating the stabilization degree adjustment instruction according to the first operation, the processor 92 is specifically configured to generate the stabilization degree adjustment instruction according to the sliding direction.

In some embodiments, when receiving the first operation of the user on the physical adjustment switch, the processor 92 is specifically configured to receive a button amount input by the user for the physical button. When generating the stabilization degree adjustment instruction according to the first operation, the processor 92 is specifically configured to generate the stabilization degree adjustment instruction according to the button amount.

In some embodiments, when generating the stabilization degree adjustment instruction according to the first operation, the processor 92 is specifically configured to determine a change of the physical adjustment switch according to the first operation, and according to the change of the physical adjustment switch and a corresponding relationship between the physical adjustment switch and a voltage, generate the stabilization degree adjustment instruction.

In some embodiments, when the stabilization degree adjustment instruction indicates the stabilization coefficient, the processor 92 is further configured to set a corresponding relationship between the voltage and the stabilization coefficient. The stabilization coefficient is used to represent the stabilization degree of the stabilization mechanism 90.

In some embodiments, the corresponding relationship may include the stabilization coefficient changing linearly with voltage or the stabilization coefficient changing nonlinearly with voltage.

In some embodiments, when obtaining the stabilization degree adjustment instruction, the processor 92 is specifically configured to receive a touch operation input by a user on a touch device and generate the stabilization degree adjustment instruction according to the touch operation.

In some embodiments, when obtaining the stabilization degree adjustment instruction, the processor 92 is specifically configured to receive the stabilization degree adjustment instruction sent by a communication device of the stabilization mechanism 90.

In some embodiments, when obtaining the stabilization degree adjustment instruction, the processor 92 is specifically configured to determine a current application scenario of the stabilization mechanism 90 and obtain the stabilization degree adjustment instruction corresponding to the current application scenario according to a correspondence between the application scenario and a preset stabilization degree adjustment instruction.

In some embodiments, the processor 92 is further configured to output prompt information before obtaining the stabilization degree adjustment instruction. The prompt information is used to remind the user to adjust the stabilization degree of the stabilization mechanism 90.

In some embodiments, the processor 92 is further configured to identify a movement state of a carrier and output a reference stabilization degree according to the movement state. The carrier is used to carry the stabilization mechanism 90.

In some embodiments, the carrier may include a support device or a creature carrying the stabilization mechanism 90.

In some embodiments, the support device is a handheld support device, or, the support device is a wearable support device, or, the support device is a movable platform.

In some embodiments, the movable platform may include one of a UAV, an unmanned vehicle, and an unmanned ship, etc.

A gimbal device is provided according to an embodiment of the present disclosure and includes a stabilization mechanism 90 as shown in FIG. 9.

In some embodiments, the gimbal device may further include an axial stabilization mechanism. The axial stabilization mechanism may be a three-axis support device, such as the three-axis gimbal mentioned above, or the axial stabilization mechanism may also be a single-axis gimbal, a double-axis gimbal or other types of gimbals.

An embodiment of the present disclosure provides a photographing device, including an imaging device, the gimbal device as described in the above embodiments, and a support device. The gimbal device is used to support the imaging device for shooting, and the gimbal device is connected to the support device. The gimbal device can change the shooting angle of the imaging device and eliminate the influence of jitter on the imaging device, so as to improve the imaging quality.

By setting up a stabilization mechanism, the photographing device can eliminate the influence of changing the shooting angle of the imaging device and eliminate the influence of jitter on the imaging device, so as to ensure the shooting quality and effect.

The imaging device may be a device for capturing images, such as a camera or a video camera. The imaging device of this embodiment at least includes a photosensitive element, and the photosensitive element is, for example, a complementary metal oxide semiconductor (CMOS) or a charge-coupled device (CCD).

The embodiment of the present disclosure provides a support device for supporting the gimbal device described in the above-mentioned embodiments for photographing.

In some embodiments, the support device is a hand-held support device, that is, the user can hold the support device for shooting, or, the support device is a wearable support device, or, the support device is a movable platform. In some embodiments, a photographing function button is provided at the support device, and the photographing function button allows the user to operate to control photographing, such as controlling a photographing mode of the imaging device, a photographing angle of the imaging device, or the like.

During the usage, when the support device does not have a vertical jitter, the vertical stabilization mechanism can horizontally support the imaging device and the axial stabilization mechanism (the axial stabilization mechanism can be omitted in some scenarios). When the support device has a vertical jitter, due to the effect of inertia, the interaction force between the imaging device, the axial stabilization mechanism and the vertical stabilization mechanism changes, and the vertical stabilization mechanism produces a movement opposite to the jitter direction to compensate for the influence of the vertical jitter on the imaging device and ensure the shooting effect.

In some embodiments, the movable platform may include one of a UAV, an unmanned vehicle, an unmanned ship, or the like.

The embodiment of the present disclosure provides a computer-readable storage medium on which a computer program is stored. When the computer program is executed, any one of the above-described stabilization degree adjustment methods in any one of the above-described embodiments is implemented.

Those of ordinary skill in the art can understand that all or part of the processes in the above-described embodiments can be implemented by a program instructing relevant hardware. The program can be stored in a computer-readable storage medium, and when the program is executed, the processes of the methods are implemented. The storage medium includes a medium that can store programs, such as a read-only memory (ROM), a random-access memory (RAM), a magnetic disk or an optical disk, etc.

The above-described embodiments are only used to illustrate the technical solutions of the disclosure and are not used to limit the technical solutions. Although the disclosure has been described in detail with reference to the foregoing embodiments, those of ordinary skill in the art should understand that it is still possible to modify the technical solutions described in the foregoing embodiments, or equivalently replace some or all of the technical features, and these modifications or replacements do not make the essence of the corresponding technical solutions deviate from the scope of the technical solutions of the embodiments of the disclosure.

What is claimed is:

1. A stabilization degree adjustment method comprising:
   obtaining a stabilization degree adjustment instruction; and
   adjusting, according to the stabilization degree adjustment instruction, a stabilization degree of a vertical stabilization mechanism to be one of a plurality of different stabilization degrees including a complete non-stabilization state and at least one of a complete stabilization state or an intermediate state, the vertical stabilization mechanism being configured to be connected to a load through an axial stabilization mechanism and to stabilize the load in a vertical direction; and
   locking the vertical stabilization mechanism in response to the vertical stabilization mechanism being in the complete non-stabilization state.

2. The stabilization degree adjustment method of claim 1, wherein adjusting the stabilization degree of the vertical stabilization mechanism according to the stabilization degree adjustment instruction includes:
   determining a stabilization coefficient according to the stabilization degree adjustment instruction, the stabilization coefficient characterizing the stabilization degree of the vertical stabilization mechanism; and
   adjusting the stabilization degree of the vertical stabilization mechanism according to the stabilization coefficient.

3. The stabilization degree adjustment method of claim 2, wherein adjusting the stabilization degree of the vertical stabilization mechanism according to the stabilization coefficient includes:
   increasing or decreasing the stabilization degree of the vertical stabilization mechanism according to the stabilization coefficient.

4. The stabilization degree adjustment method of claim 3, wherein a value range of the stabilization coefficient is a preset value interval, and the stabilization coefficient is positively correlated with the stabilization degree within the preset value interval.

5. The stabilization degree adjustment method of claim 1, wherein locking the vertical stabilization mechanism includes at least one of:
   locking the vertical stabilization mechanism at a first angle, the first angle being a preset value of a joint angle of a transmission mechanism of the vertical stabilization mechanism connected to a base;
   locking the vertical stabilization mechanism at a second angle, the second angle being a value of the joint angle of the transmission mechanism when the stabilization degree adjustment instruction is obtained; or
   detecting a difference between the first angle and the second angle, and
     in response to the difference meeting a preset condition, locking the vertical stabilization mechanism at the first angle; and
     in response to the difference not meeting the preset condition, locking the vertical stabilization mechanism at the second angle.

6. The stabilization degree adjustment method of claim 1, wherein adjusting the stabilization degree of the vertical stabilization mechanism according to the stabilization degree adjustment instruction includes:
   adjusting a change range of a terminal end of the vertical stabilization mechanism according to the stabilization degree adjustment instruction.

7. The stabilization degree adjustment method of claim 6, wherein:
   the stabilization degree adjustment instruction indicating a stabilization coefficient characterizing the stabilization degree of the vertical stabilization mechanism; and
   adjusting the change range of the terminal end of the vertical stabilization mechanism includes:
     determining a current end-to-ground speed of the vertical stabilization mechanism; and
     according to the stabilization coefficient and a desired end-to-ground speed, adjusting the current end-to-ground speed to adjust the change range of the terminal end of the vertical stabilization mechanism.

8. The stabilization degree adjustment method of claim 7, wherein determining the current end-to-ground speed of the vertical stabilization mechanism includes:
   obtaining a current joint angle of a transmission mechanism of the vertical stabilization mechanism connected to a base;
   obtaining speed information of the base;
   obtaining speed information of the terminal end of the vertical stabilization mechanism; and
   determining the current end-to-ground speed of the vertical stabilization mechanism based on the current joint angle, the speed information of the base, and the speed information of the terminal end.

9. The stabilization degree adjustment method of claim 1, wherein obtaining the stabilization degree adjustment instruction includes:
   receiving an operation of a user on a physical adjustment switch; and
   generating the stabilization degree adjustment instruction according to the operation.

10. The stabilization degree adjustment method of claim 9, wherein:
   receiving the operation includes receiving a rotation direction input by the user on an adjustment knob and generating the stabilization degree adjustment instruction according to the operation includes generating the stabilization degree adjustment instruction according to the rotation direction;
   receiving the operation includes receiving a sliding direction input by the user on an adjustment slider and generating the stabilization degree adjustment instruction according to the operation includes generating the stabilization degree adjustment instruction according to the sliding direction; and/or
   receiving the operation includes receiving a button amount input by the user on a physical button and generating the stabilization degree adjustment instruction according to the operation includes generating the stabilization degree adjustment instruction according to the button amount.

11. The stabilization degree adjustment method of claim 9, wherein generating the stabilization degree adjustment instruction according to the operation includes:
   determining a change of the physical adjustment switch according to the operation; and
   according to the change of the physical adjustment switch and a corresponding relationship between the physical adjustment switch and a voltage, generating the stabilization degree adjustment instruction.

12. The stabilization degree adjustment method of claim 11,
   wherein the stabilization degree adjustment instruction indicates a stabilization coefficient characterizing the stabilization degree of the vertical stabilization mechanism;
   the method further comprising:
      setting a corresponding relationship between the voltage and the stabilization coefficient.

13. The stabilization degree adjustment method of claim 12, wherein the corresponding relationship includes:
   the stabilization coefficient changing linearly with the voltage; or
   the stabilization coefficient changing nonlinearly with the voltage.

14. The stabilization degree adjustment method of claim 1, wherein obtaining the stabilization degree adjustment instruction includes at least one of:
   receiving a touch operation input by a user on a touch device and generating the stabilization degree adjustment instruction according to the touch operation;
   receiving the stabilization degree adjustment instruction sent by a communication device of the vertical stabilization mechanism; or
   determining a current application scenario of the vertical stabilization mechanism and obtaining the stabilization degree adjustment instruction corresponding to the current application scenario according to a correspondence between application scenarios and preset stabilization degree adjustment instructions.

15. A vertical stabilization mechanism configured to support a load, comprising:
   a memory storing program codes; and
   a processor configured to call the program codes and execute the program codes to:
      obtain a stabilization degree adjustment instruction; and
      adjust, according to the stabilization degree adjustment instruction, a stabilization degree of the vertical stabilization mechanism to be one of a plurality of different stabilization degrees including a complete non-stabilization state and at least one of a complete stabilization state or an intermediate state, the vertical stabilization mechanism being configured to be connected to the load through an axial stabilization mechanism and to stabilize the load in a vertical direction; and
      lock the vertical stabilization mechanism in response to the vertical stabilization mechanism being in the complete non-stabilization state.

16. A gimbal device comprising:
   an axial stabilization mechanism configured to support a load;
   a vertical stabilization mechanism configured to be connected to the load through the axial stabilization mechanism and to stabilize the load in a vertical direction;
   a memory storing program codes; and
   a processor configured to call the program codes and execute the program codes to:
      obtain a stabilization degree adjustment instruction; and
      adjust, according to the stabilization degree adjustment instruction, a stabilization degree of the vertical stabilization mechanism to be one of a plurality of different stabilization degrees including a complete non-stabilization state and at least one of a complete stabilization state or an intermediate state; and
      lock the vertical stabilization mechanism in response to the vertical stabilization mechanism being in the complete non-stabilization state.

17. The stabilization degree adjustment method of claim 1, wherein the stabilization degree includes:
   a first stabilization state, in which the vertical stabilization mechanism is controlled to follow a movement of a base, the base being a support of the vertical stabilization mechanism or an intermediate transition member connected to another device; and
   a second stabilization state, in which the vertical stabilization mechanism is controlled to be isolated from the movement of the base.

18. The stabilization degree adjustment method of claim 1, wherein:
   the vertical stabilization mechanism includes:
      a transmission mechanism; and
      a motor connected to the transmission mechanism and configured to drive the transmission mechanism to drive the axial stabilization mechanism to move to stabilize the load in the vertical direction; and
   adjusting the stabilization degree of the vertical stabilization mechanism according to the stabilization degree adjustment instruction includes:
      adjusting, according to the stabilization degree adjustment instruction, the stabilization degree of the vertical stabilization mechanism through the motor.

19. The stabilization degree adjustment method of claim 1, wherein:
   the axial stabilization mechanism is configured to drive the load to rotate around at least one axis; and
   the vertical stabilization mechanism is configured to drive the axial stabilization mechanism and the load to move in the vertical direction.

20. The stabilization degree adjustment method of claim 1, wherein adjusting the stabilization degree of the vertical stabilization mechanism includes:

adjusting, according to the stabilization degree adjustment instruction, a response speed of a terminal end of the stabilization mechanism, so as to adjust the stabilization degree of the vertical stabilization mechanism.

\* \* \* \* \*